(12) United States Patent
Pierpont et al.

(10) Patent No.: US 8,096,124 B2
(45) Date of Patent: Jan. 17, 2012

(54) EXHAUST SYSTEM HAVING PARALLEL ASYMMETRIC TURBOCHARGERS AND EGR

(75) Inventors: David Andrew Pierpont, Dunlap, IL (US); John Parker Timmons, Chillicothe, IL (US); Jonathan P. Kilkenny, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 500 days.

(21) Appl. No.: 12/285,145

(22) Filed: Sep. 30, 2008

(65) Prior Publication Data

US 2010/0077747 A1    Apr. 1, 2010

(51) Int. Cl.
    F02B 33/44    (2006.01)

(52) U.S. Cl. .................... 60/605.2; 60/612

(58) Field of Classification Search ........... 60/597–612; 123/559.1–565
    See application file for complete search history.

(56) References Cited

U.S. PATENT DOCUMENTS

| | | | |
|---|---|---|---|
| 4,179,892 A | 12/1979 | Heydrich | |
| 4,249,382 A | 2/1981 | Evans et al. | |
| 5,517,976 A * | 5/1996 | Bachle et al. | 60/605.2 |
| 5,611,202 A * | 3/1997 | Sumser et al. | 60/605.2 |
| 5,794,445 A * | 8/1998 | Dungner | 60/605.2 |
| 6,202,414 B1 * | 3/2001 | Schmidt et al. | 60/612 |
| 6,237,335 B1 | 5/2001 | Lönnqvist | |
| 6,263,673 B1 * | 7/2001 | Schmidt et al. | 60/612 |
| 6,412,279 B1 | 7/2002 | Coleman et al. | |
| 6,422,222 B1 * | 7/2002 | Arbeiter et al. | 123/568.2 |
| 6,425,381 B1 | 7/2002 | Rammer | |
| 6,672,061 B2 | 1/2004 | Schmid et al. | |
| 6,694,736 B2 | 2/2004 | Pflüger | |
| 6,917,873 B2 * | 7/2005 | Itoyama | 701/108 |
| 6,973,787 B2 * | 12/2005 | Klingel | 60/612 |
| 7,076,955 B2 * | 7/2006 | Herz et al. | 60/612 |
| 7,080,635 B2 * | 7/2006 | Sato | 123/568.2 |
| 7,165,403 B2 * | 1/2007 | Sun et al. | 60/612 |
| 7,426,830 B2 * | 9/2008 | Schorn et al. | 60/612 |
| 7,540,150 B2 * | 6/2009 | Schmid et al. | 60/612 |
| 7,571,608 B2 * | 8/2009 | Boyapati et al. | 60/612 |
| 2003/0159443 A1 | 8/2003 | Huter | |
| 2006/0042247 A1 | 3/2006 | Haugen | |
| 2006/0101819 A1 * | 5/2006 | Schorn et al. | 60/602 |
| 2007/0107430 A1 | 5/2007 | Schmid et al. | |
| 2007/0130947 A1 | 6/2007 | Baumgard et al. | |
| 2007/0175215 A1 | 8/2007 | Rowells | |
| 2008/0000228 A1 | 1/2008 | Kieser | |
| 2008/0110170 A1 | 5/2008 | Noodt et al. | |
| 2010/0024416 A1 * | 2/2010 | Gladden et al. | 60/612 |
| 2010/0024419 A1 * | 2/2010 | Pierpont et al. | 60/624 |

* cited by examiner

Primary Examiner — Thomas Denion
Assistant Examiner — Mary A Davis
(74) Attorney, Agent, or Firm — Finnegan, Henderson, Farabow, Garrett & Dunner LLP

(57) ABSTRACT

An exhaust system for a use with a combustion engine is provided. The exhaust system may have a first exhaust manifold configured to receive exhaust from the engine, and at least one turbocharger driven by exhaust from the first exhaust manifold. The exhaust system may also have a second exhaust manifold configured to receive exhaust from the engine in parallel with the first exhaust manifold, and at least two turbochargers driven by exhaust from the second exhaust manifold. The exhaust manifold may further have an exhaust gas recirculation circuit in fluid communication with only the first exhaust manifold. A number of turbochargers that receives exhaust from the first exhaust manifold may be less than a number of turbochargers that receives exhaust from the second exhaust manifold.

20 Claims, 1 Drawing Sheet

EXHAUST SYSTEM HAVING PARALLEL ASYMMETRIC TURBOCHARGERS AND EGR

TECHNICAL FIELD

The present disclosure is directed to an exhaust system and, more particularly, to an exhaust system having parallel asymmetric turbochargers and exhaust gas recirculation (EGR).

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves turbocharger operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

EGR systems require a certain level of backpressure from the exhaust system to push a desired amount of exhaust back to the intake of the engine. And, the backpressure needed for adequate operation of the EGR system varies with engine load. Although effective, utilizing exhaust backpressure to drive EGR can adversely affect turbocharger operation, thereby reducing the air compressing capability of the air induction system. The reduced air compressing capability may, in turn, reduce the engine's fuel economy and possibly the amount of power generated by the engine. Thus, a system is required that provides sufficient and variable exhaust backpressure to drive EGR flow without adversely affecting turbocharger or engine operation.

An example of a turbocharged engine have exhaust gas recirculation is disclosed in U.S. Pat. No. 6,694,736 (the '736 patent) issued to Pflüger on Feb. 24, 2004. In particular, the '736 patent discloses an engine with a common intake manifold and divided exhaust manifolds. Two high-pressure turbochargers having respective high-pressure compressors connected to and driven by high-pressure turbines are separately associated with the common intake manifold and the two exhaust manifolds, and a single low-pressure turbocharger receives exhaust from each of the two high-pressure turbochargers (i.e., the engine of the '736 patent includes three turbochargers arranged into two stages). In addition, exhaust return pipes are connected to the intake manifold downstream of the high-pressure compressors to direct exhaust from upstream of the high-pressure turbines back into the engine.

The disclosed exhaust system is directed to overcoming one or more of the problems set forth above and/or other problems of the prior art.

SUMMARY

In one aspect, the disclosure is directed toward an exhaust system for an engine. The exhaust system may include a first exhaust manifold configured to receive exhaust from the engine, and at least one turbocharger driven by exhaust from the first exhaust manifold. The exhaust system may also include a second exhaust manifold configured to receive exhaust from the engine in parallel with the first exhaust manifold, and at least two turbochargers driven by exhaust from the second exhaust manifold. The exhaust manifold may further include an exhaust gas recirculation circuit in fluid communication with only the first exhaust manifold. A number of turbochargers that receives exhaust from the first exhaust manifold may be less than a number of turbochargers that receives exhaust from the second exhaust manifold.

In another aspect, the disclosure is directed toward another exhaust system for an engine. This exhaust system may include a first exhaust manifold configured to receive exhaust from the engine, a second exhaust manifold configured to receive exhaust from the engine in parallel with the first exhaust manifold, and a balance valve configured to selectively allow exhaust from the first exhaust manifold to pass to the second exhaust manifold. The exhaust system may also include at least one turbocharger, each of the at least one turbocharger being driven by exhaust from only one of the first and second exhaust manifolds. The exhaust system may further include an exhaust gas recirculation circuit in fluid communication with only the first exhaust manifold. A number of turbochargers that receives exhaust from the first exhaust manifold may be less than a number of turbochargers that receives exhaust from the second exhaust manifold.

In yet another aspect, the disclosure is directed toward a method of handling exhaust from an engine. The method may include receiving exhaust from a first plurality of combustion chambers, and dividing the exhaust received from the first plurality of combustion chambers into a first flow of exhaust and a second flow of exhaust. The method may further include removing energy from the first flow of exhaust, and removing energy from the second flow of exhaust in parallel with a removal of energy from the first flow of exhaust. The method may also include receiving exhaust from a second plurality of combustion chambers, and removing energy from the exhaust received from the second plurality of combustion chambers in parallel with a removal of energy from the first and second flows of exhaust. The method may additionally include directing a portion of the exhaust received from only the second plurality of combustion chambers back into the engine.

DETAILED DESCRIPTION

Figure 1:
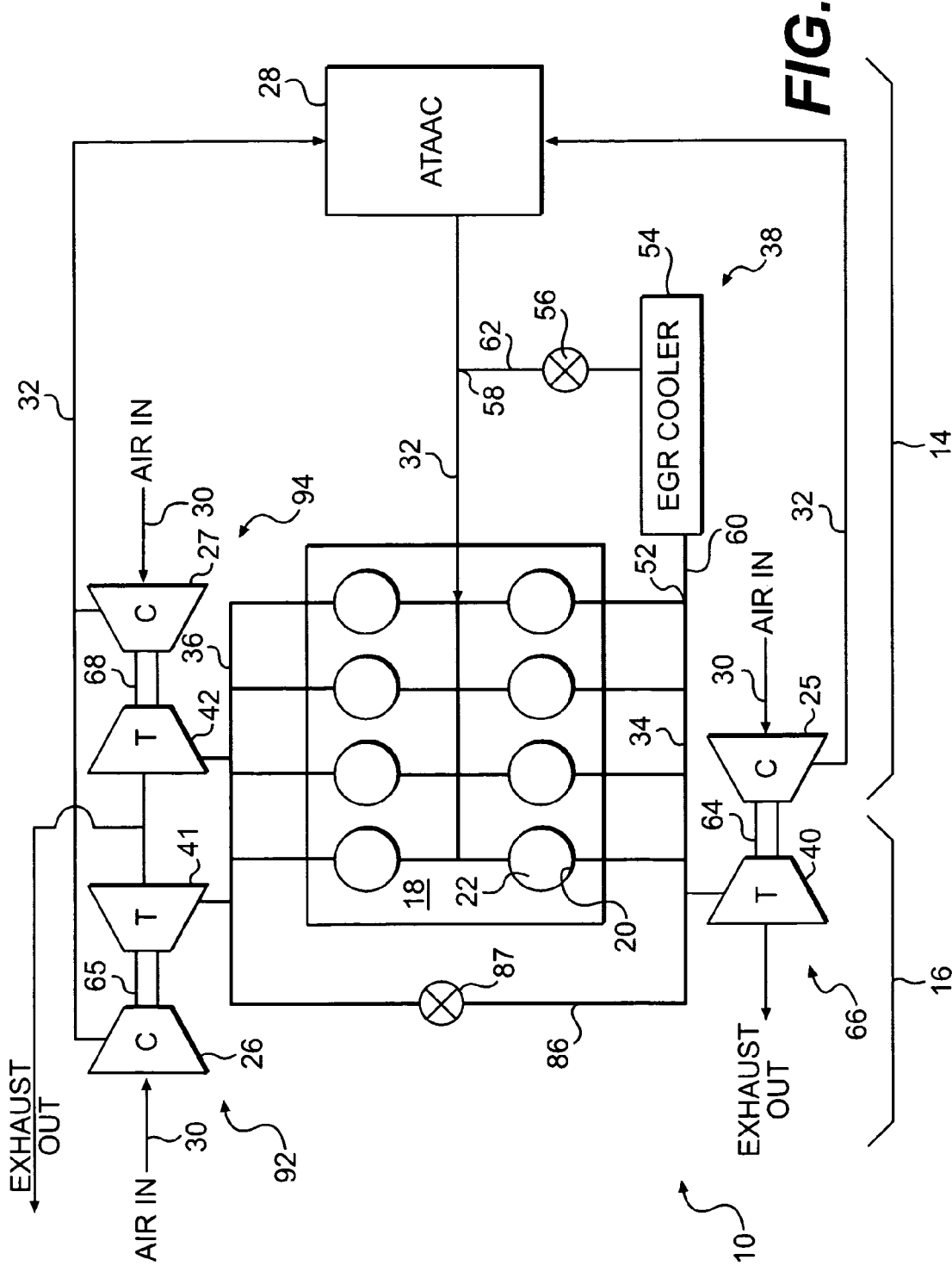
FIG. 1 is a schematic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber 22. In the illustrated embodiment, power source 12 includes eight such combustion chambers 22 arranged in a V-configuration (i.e., a configuration having two banks or rows of combustion chambers 22). However, it is contemplated that power source 12 may include a greater or lesser number of combustion chambers 22 and that combustion chambers 22 may be arranged in an in-line configuration, if desired.

Air induction system 14 may include components configured to introduce charged air into power source 12. For example, air induction system 14 may include at least one compressor, and an air cooler 28. Each included compressor may embody a fixed geometry compressor, a variable geometry compressor, or any other type of compressor configured to receive air and compress the air to a predetermined pressure level before it enters power source 12. In one embodiment, air induction system 14 includes three substantially identical compressors (a first compressor 25, a second compressor 26, and a third compressor 27) disposed in a parallel relationship and connected to power source 12 via a fluid passageway 32 (i.e., fluid passageway 32 may function as a common intake manifold). Air cooler 28 may embody an air-to-air heat exchanger, an air-to-liquid heat exchanger, or a combination of both, and be configured to facilitate the transfer of thermal energy to or from the compressed air directed into power source 12. Air cooler 28 may be disposed within fluid passageway 32, between power source 12 and compressors 25-27.

Exhaust system 16 may include components configured to direct exhaust from power source 12 to the atmosphere. Specifically, exhaust system 16 may include a first exhaust manifold 34 and a second exhaust manifold 36 in separate communication with combustion chambers 22, an exhaust gas recirculation (EGR) circuit 38 fluidly communicating first exhaust manifold 34 with air induction system 14, and at least one turbine associated with first and second exhaust manifolds 34, 36. It is contemplated that exhaust system 16 may include components in addition to those listed above such as, for example, particulate traps, constituent absorbers or reducers, and attenuation devices, if desired.

Exhaust produced during the combustion process within combustion chambers 22 may exit power source 12 via either first exhaust manifold 34 or second exhaust manifold 36. In the embodiment shown, first exhaust manifold 34 may fluidly connect a first plurality of combustion chambers 22 of power source 12 (e.g., the four combustion chambers 22 shown in the lower bank of FIG. 1) to a first turbine 40. Second exhaust manifold 36 may fluidly connect a second plurality of combustion chambers 22 of power source 12 (e.g., the four combustion chambers shown in the upper bank of FIG. 1) to a second turbine 41 and to a third turbine 42 in parallel. In one example, each of first, second, and third turbines 40-42 may be substantially identical.

EGR circuit 38 may include components that cooperate to redirect a portion of the exhaust produced by power source 12 from first exhaust manifold 34 to air induction system 14. Specifically, EGR circuit 38 may include an inlet port 52, an EGR cooler 54, a recirculation control valve 56, and a discharge port 58. Inlet port 52 may be fluidly connected to first exhaust manifold 34 upstream of first turbine 40, and fluidly connected to EGR cooler 54 via a fluid passageway 60. Discharge port 58 may receive exhaust from EGR cooler 54 via a fluid passageway 62, and discharge exhaust to air induction system 14 at a location upstream or downstream of air cooler 28. Recirculation control valve 56 may be disposed within fluid passageway 62, between EGR cooler 54 and discharge port 58. It is further contemplated that a check valve (not shown), for example a reed-type check valve may be situated within fluid passageway 62 upstream or downstream of recirculation control valve 56 at a location where exhaust mixes with inlet air to provide for a unidirectional flow of exhaust through EGR circuit 38 (i.e., to inhibit bidirectional exhaust flows through EGR circuit 38), if desired.

Recirculation control valve 56 may be located to regulate a recirculated flow of exhaust through EGR circuit 38. Recirculation control valve 56 may be any type of valve known in the art such as, for example, a butterfly valve, a diaphragm valve, a gate valve, a ball valve, a poppet valve, or a globe valve. In addition, recirculation control valve 56 may be solenoid-actuated, hydraulically-actuated, pneumatically-actuated or actuated in any other manner to selectively restrict or completely block the flow of exhaust through fluid passageways 60 and 62.

EGR cooler 54 may be configured to cool exhaust flowing through EGR circuit 38. EGR cooler 54 may include a liquid-to-air heat exchanger, an air-to-air heat exchanger, or any other type of heat exchanger known in the art for cooling an exhaust flow.

First turbine 40 may be a fixed geometry turbine having a single volute and being configured to receive exhaust from first exhaust manifold 34 to drive one or more of compressors 25-27. For example, first turbine 40 may be directly and mechanically connected to first compressor 25 by way of a shaft 64 to form a first turbocharger 66. As the hot exhaust gases exiting power source 12 move through first turbine 40 and expand against blades (not shown) therein, first turbine 40 may rotate and drive the connected first compressor 25 to pressurize air directed into power source 12. It is contemplated that first turbine 40 may alternatively be a variable geometry turbine having an adjustable nozzle ring or adjustable vane members, if desired.

Second turbine 41 may also be connected to one of compressors 25-27 to form a fixed or variable geometry turbocharger 92. For example, second turbine 41 may be directly and mechanically connected to second compressor 26 by way of a shaft 65 to form second turbocharger 92. In the depicted arrangement, second turbine 41 may be a single volute turbine situated to receive exhaust from second exhaust manifold 36. As the hot exhaust gases exiting power source 12 move through second turbine 41 and expand against blades (not shown) therein, second turbine 41 may rotate and drive the connected second compressor 26 to pressurize air directed into power source 12.

Third turbine 42 may similarly be connected to one of compressors 25-27 to form a third fixed or variable geometry turbocharger 94. For example, third turbine 42 may be directly and mechanically connected to third compressor 27 by way of a shaft 68 to form third turbocharger 94. In the depicted arrangement, third turbine 42 may be a single volute turbine situated to receive exhaust from second exhaust manifold 36 in parallel with second turbine 41. As the hot exhaust gases exiting power source 12 move through third turbine 42 and expand against blades (not shown) therein, third turbine 42 may rotate and drive third compressor 27 to pressurize air directed into power source 12.

First turbocharger 66 may have a flow capacity different than a combined flow capacity of second and third turbochargers 92, 94 (i.e., exhaust system 16 may be asymmetric both in a number of turbochargers associated with each of first and second exhaust manifolds 34, 36 and in a total flow capacity of the associated turbochargers). Specifically, first turbocharger 66 may restrict exhaust flow to a degree greater (i.e., have a lower flow capacity) than a combined restriction of second and third turbochargers 92, 94. This substantially decreased flow capacity may function to increase a back pressure within first exhaust manifold 34 by an amount greater than a pressure within second exhaust manifold 36. The increased back pressure of first exhaust manifold 34 may help force exhaust through EGR circuit 38 and back into power source 12 for subsequent combustion. In one example, the decreased flow capacity of first turbocharger 66 may be due to a decreased cross-sectional flow area or area/radius (A/R) ratio at a housing opening of first turbine 40 (as compared to a combined cross-sectional flow area or A/R ratio). In another example, the decreased flow capacity may be due to a smaller volute area or A/R ratio, turbine wheel diameter, trim profile, or nozzle vane orientation or setting. It is contemplated that other ways of providing the decreasing the flow capacity of first turbine 40 may also be possible.

A balance passageway 86 and an associated balance valve 87 may also be included within exhaust system 16 and utilized to fluidly communicate exhaust from first exhaust manifold 34 with second exhaust manifold 36. Balance valve 87 may be disposed within balance passageway 86 and configured to regulate the pressure of exhaust flowing through first exhaust manifold 34 by selectively allowing exhaust to flow from first exhaust manifold 34 to second exhaust manifold 36 (i.e., by selectively adjusting a restriction placed on the flow through balance passageway 86). It should be understood that the pressure within first exhaust manifold 34 may affect the amount of exhaust directed through EGR circuit 38. That is, when a greater amount of exhaust flows from first exhaust manifold 34 to second exhaust manifold 36 by way of balance passageway 86, a pressure within first exhaust manifold 34 may be reduced and, as a result of the pressure reduction, an amount of exhaust passing from first exhaust manifold 34 through EGR circuit 38 may be reduced proportionally.

Balance valve 87 may be any type of valve such as, for example, a butterfly valve, a diaphragm valve, a gate valve, a ball valve, a globe valve, a poppet valve, or any other valve known in the art. Furthermore, balance valve 87 may be solenoid-actuated, hydraulically-actuated, pneumatically-actuated or actuated in any other manner to selectively restrict or completely block the flow of exhaust between first and second exhaust manifolds 34, 36.

INDUSTRIAL APPLICABILITY

The disclosed exhaust system may be implemented into any power system application where charged air induction and exhaust gas recirculation are utilized. The disclosed exhaust system may be suitable for both high- and low-boost applications, be simple, and offer enhanced efficiency. Specifically, the asymmetric nature of exhaust system 16 may offer adequate boosting at both low and high engine speeds, without the need for extensive valving or flow path changing. Further, because exhaust system 16 may maintain a level of separation between first and second exhaust manifolds 34, 36, the exhaust pulse preservation provided by divided manifolds may also be maintained. Also, the disclosed exhaust system may allow for one bank of combustion chambers 22 to operate at a substantially lower back pressure than an intake of power system 10, while still providing sufficient EGR flow from the remaining bank of combustion chambers 22 to meet low emissions requirements. By not having to increase the back pressure of all combustion chambers 22, engine efficiency may be improved. In addition, the location of recirculation control valve 56 downstream of EGR cooler 54 may result in cool operating temperatures and extended component life.

It will be apparent to those skilled in the art that various modifications and variations can be made to the disclosed exhaust system. Other embodiments will be apparent to those skilled in the art from consideration of the specification and practice of the disclosed exhaust system. For example, although FIG. 1 shows three turbochargers being associated with power system 10, any number of turbochargers may be included as long as a number of turbochargers associated with first exhaust manifold 34 is less than a number of turbochargers associated with second exhaust manifold 36. It is intended that the specification and examples be considered as exemplary only, with a true scope being indicated by the following claims and their equivalents.

What is claimed is:

1. An exhaust system for an engine, comprising:
a first exhaust manifold configured to receive exhaust from the engine;
at least one turbocharger driven by exhaust from the first exhaust manifold;
a second exhaust manifold configured to receive exhaust from the engine in parallel with the first exhaust manifold;
at least two turbochargers driven by exhaust from the second exhaust manifold; and
an exhaust gas recirculation circuit in fluid communication with only the first exhaust manifold,
wherein a number of turbochargers that receives exhaust from the first exhaust manifold is less than a number of turbochargers that receives exhaust from the second exhaust manifold.

2. The exhaust system of claim 1, wherein:
the engine has a plurality of cylinders arranged in two rows;
the at least one turbocharger is associated with only a first of the two rows; and
the at least two turbochargers are associated with only a second of the two rows.

3. The exhaust system of claim 2, further including a common intake manifold, wherein the exhaust gas recirculation circuit fluidly connects the first exhaust manifold to the common intake manifold.

4. The exhaust system of claim 1, further including:
a passageway connecting the first and second exhaust manifolds; and
a balance valve located within the passageway to selectively restrict a flow of exhaust through the passageway.

5. The exhaust system of claim 4, further including a control valve located within the exhaust gas recirculation circuit to regulate a flow of exhaust directed through the exhaust gas recirculation circuit.

6. The exhaust system of claim 5, further including a cooler located within the exhaust gas recirculation circuit upstream of the control valve.

7. The exhaust system of claim 1, wherein a flow capacity of the at least one turbocharger is lower than a combined flow capacity of the at least two turbochargers.

8. The exhaust system of claim 7, wherein each of the at least one and the at least two turbochargers are substantially identical.

9. An exhaust system for an engine, comprising:
a first exhaust manifold configured to receive exhaust from the engine;
a second exhaust manifold configured to receive exhaust from the engine in parallel with the first exhaust manifold, wherein the first exhaust manifold is configured to receive a higher pressure exhaust flow than the second exhaust manifold during operation of the engine;
a balance valve configured to selectively vary a difference in exhaust pressure between the first exhaust manifold and the second exhaust manifold;
at least one turbocharger, each of the at least one turbocharger being driven by exhaust from only one of the first and second exhaust manifolds; and
an exhaust gas recirculation circuit is directly connected to the intake manifold to allow exhaust form the first exhaust manifold to enter directly into the intake manifold,
wherein a number of turbochargers that receives exhaust from the first exhaust manifold is less than a number of turbochargers that receives exhaust from the second exhaust manifold.

10. The exhaust system of claim 9, wherein:
the engine has a plurality of cylinders arranged in two rows;
the first exhaust manifold is associated with only a first of the two rows; and
the second exhaust manifold is associated with only a second of the two rows.

11. The exhaust system of claim 10, wherein the intake manifold is a common intake manifold for each of the two rows of cylinders.

12. The exhaust system of claim 9, further including a control valve located within the exhaust gas recirculation circuit to regulate a flow of exhaust directed through the exhaust gas recirculation circuit.

13. The exhaust system of claim 12, further including a cooler located within the exhaust gas recirculation circuit upstream of the control valve.

14. The exhaust system of claim 9, wherein a combined flow capacity of turbochargers driven by exhaust from the first exhaust manifold is lower than a combined flow capacity of turbochargers driven by exhaust from the second exhaust manifold.

15. The exhaust system of claim 9, wherein each of the at least one turbocharger are substantially identical.

16. A method of handling exhaust from an engine, comprising:
receiving exhaust from a first plurality of combustion chambers;
dividing the exhaust received from the first plurality of combustion chambers into a first flow of exhaust and a second flow of exhaust;
removing energy from the first flow of exhaust;
removing energy from the second flow of exhaust in parallel with a removal of energy from the first flow of exhaust;
receiving exhaust from a second plurality of combustion chambers;
removing energy from the exhaust received from the second plurality of combustion chambers in parallel with a removal of energy from the first and second flows of exhaust; and
recirculating a portion of the exhaust received from only the second plurality of combustion chambers back into an intake manifold of the engine; and
varying the portion of exhaust that is recirculated by selectively passing the exhaust received from the second plurality of combustion chambers to mix with exhaust received from the first plurality of combustion chambers.

17. The method of claim 16, further including directing the energy removed from the first flow of exhaust, the second flow of exhaust, and the second plurality of combustion chambers to independently compress air directed into the engine.

18. The method of claim 16, wherein a number of the first plurality of combustion chambers is equal to a number of the second plurality of combustion chambers.

19. The method of claim 16, wherein mixing of the exhaust from the second plurality of combustion chambers with exhaust from the first plurality of combustion chambers occurs before dividing the exhaust into the first and second flows of exhaust.

20. A power system, comprising:
a combustion engine having a first plurality of combustion chambers and a second plurality of combustion chambers;
a first exhaust manifold configured to receive exhaust from the first plurality of combustion chambers;
at least one turbocharger driven by exhaust from the first exhaust manifold;
a second exhaust manifold configured to receive exhaust from the second plurality of combustion chambers in parallel with the first exhaust manifold;
at least two turbochargers driven by exhaust from the second exhaust manifold and having a higher flow capacity than the at least one turbocharger;
an exhaust gas recirculation circuit in fluid communication with only the first exhaust manifold;
a passageway connecting the first and second exhaust manifolds; and
a balance valve located within the passageway to selectively restrict a flow of exhaust through the passageway,
wherein a number of turbochargers that receives exhaust from the first exhaust manifold is less than a number of turbochargers that receives exhaust from the second exhaust manifold.

* * * * *